No. 610,456. Patented Sept. 6, 1898.
A. V. NELSON.
PULVERIZER AND HARROW.
(Application filed Sept. 7, 1897.)
(No Model.) 2 Sheets—Sheet 1.
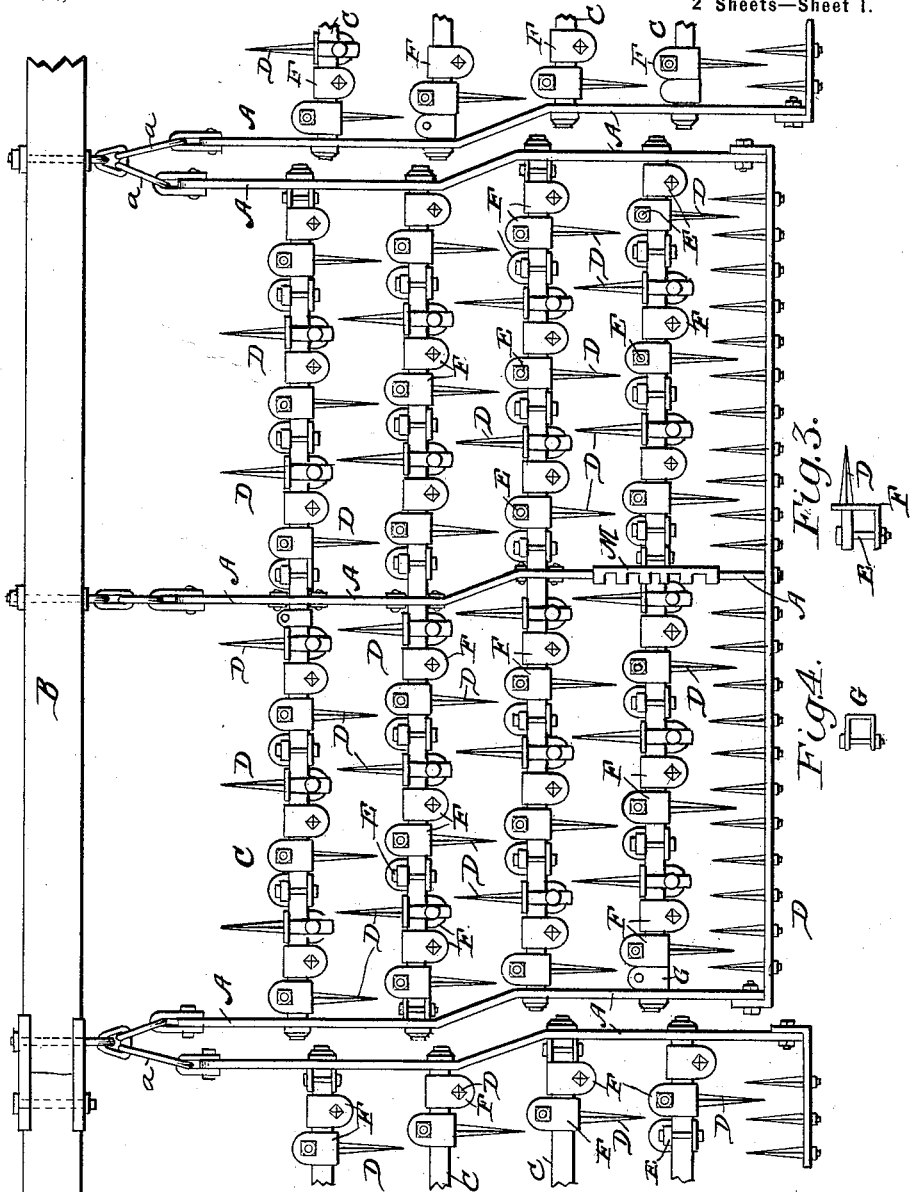
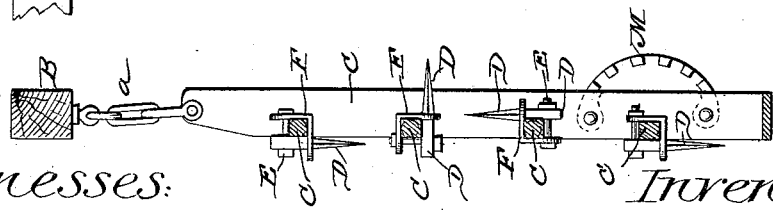
Witnesses: Inventor.
Otto W. Kernander. Andrew V. Nelson.
John A. Lindquist.

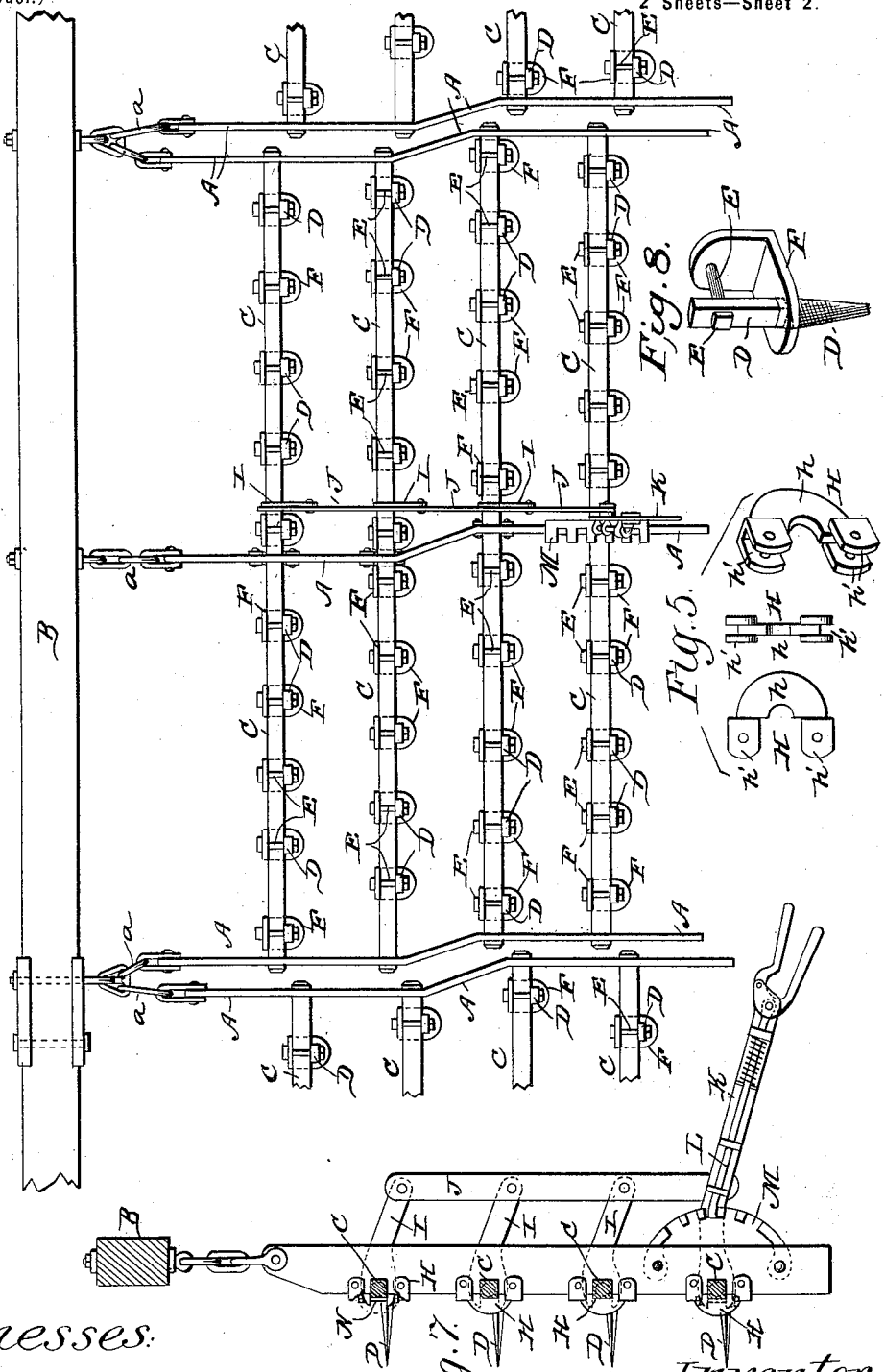

UNITED STATES PATENT OFFICE.

ANDREW V. NELSON, OF GALESBURG, ILLINOIS.

PULVERIZER AND HARROW.

SPECIFICATION forming part of Letters Patent No. 610,456, dated September 6, 1898.

Application filed September 7, 1897. Serial No. 650,823. (No model.)

*To all whom it may concern:*

Be it known that I, ANDREW V. NELSON, residing at Galesburg, in the county of Knox and State of Illinois, have invented a new and useful Improved Harrow and Pulverizer, of which the following is a specification.

My invention is an improvement in harrows which are also adapted to operate as pulverizers or clod-crushers, and the novelty is embodied in the construction and combination of parts, as hereinafter described and claimed.

In the accompanying drawings, Figure 1 is a plan view of my invention arranged as a pulverizer or clod-crusher. Fig. 2 is a cross-section of the apparatus. Fig. 3 is a side view of a harrow-tooth and clamp therefor. Fig. 4 is a side view of a spacing-clamp. Fig. 5 includes side, edge, and perspective views of the clip forming part of the bearing of one of the rotatable shafts. Fig. 6 is a plan view of the apparatus arranged as a harrow. Fig. 7 is a cross-section of the same. Fig. 8 is a detail perspective view.

In Fig. 1, which represents the pulverizer proper, three parallel bars A are loosely connected by links $a$ with a draft-bar B, which is arranged at right angles to the parts A. The rotatable shafts C, carrying the harrow-teeth D, are journaled in the frame-bars A. The latter have a lateral bend at the middle of their length in order that the harrow-teeth D on the several shafts C may be arranged out of line.

The teeth D are provided with a shoulder (see Fig. 8) and a flat shank having an aperture in its outer end to receive a screw-bolt E, as shown. The said shank passes through one arm of a right-angled clip F, and the bolt E passes through the other arm, whereby the clip and bolt serve as a clamp for securing the teeth D to the rotatable shafts C—that is to say, the clip and bolt embrace three sides of the rectangular shafts C, and the tooth-shank lies flat against the remaining side. This construction and combination of parts enable the teeth D to be quickly removed from or adjusted along the shafts C.

The teeth D are so arranged on each shaft C that no two adjacent ones project in the same direction. They are placed abutting and may be spaced from the frame-bars A by means of a clamp G. (See Figs. 1 and 4.)

The round journals of the shafts C rotate in bearings whose lower half is formed of a clip H, Fig. 5, the same being constructed of a curved or semicircular bar $h$, having a central semicircular notch to receive a shaft-journal, and parallel perforated ears or lugs $h'$, which embrace opposite sides of a frame-bar A and are secured thereto by a transverse bolt or rivet.

As shown in Fig. 1, the arrangement of the teeth D on the shafts C is such that when draft is applied the shafts will rotate and the apparatus will thereby act as a pulverizer or clod-crusher. When the apparatus is to be used as a harrow, (see Figs. 6 and 7,) all the teeth D are detached save those which point in one direction, and I also apply an attachment which is adapted to lock the bars with the teeth D held vertical and pendent, Fig. 7, so that they will enter the soil and drag through the same as required. Such attachment is composed of a series of lever-arms I, a horizontal bar J, pivoted to and connecting their upper ends, and a hand-lever K, which is also pivoted to said bar J and provided with a spring-catch L, adapted to engage a notched segment or rack M, as shown in Figs. 6 and 7. The lower ends of the lever-arms I and lever K have rectangular notches adapted to embrace the squared portions of the toothed bars C. The prongs or bifurcated portions of the front one of said lever-arms I and the lever K project below the bars C far enough to adapt them to receive a fastening-bolt N, which extends across the under side of a bar. By this means the lever attachment may be easily and quickly secured to or removed from the bars C by simply applying or removing the bolts N, yet when the attachment is in place it acts effectively for holding the teeth D at any required angle. I am thus enabled to adapt my apparatus for use in either capacity as a harrow or pulverizer with little delay and labor, while the lever attachment is itself simple and inexpensive in construction.

What I claim is—

1. The combination with square rotatable shafts, of harrow-teeth having shouldered shanks and the clamps composed of right-angular clips having apertures in their ends, and a bolt and nut arranged as shown and described.

2. The combination with the rotatable polygonal shafts having rounded journal portions, the flat transverse end and middle bars forming fixed portions of the frame in which the rotatable shafts are journaled, the fixed bars having semicircular notches in the under side, and the clip-bearings, composed of a semicircular notched bar having bifurcated and perforated ends adapted to embrace the fixed transverse bars, and bolts or rivets securing said bearings in place, as shown and described.

Signed at Galesburg, Illinois.

ANDREW V. NELSON.

Witnesses:
OTTO W. KERNANDER,
JOHN A. LINDQUIST.